(No Model.)
G. A. GOODSON.
MATRIX MAKING MACHINE.
No. 478,258.　　　　　　　Patented July 5, 1892.
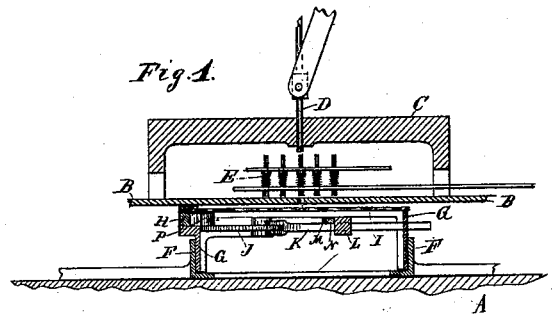
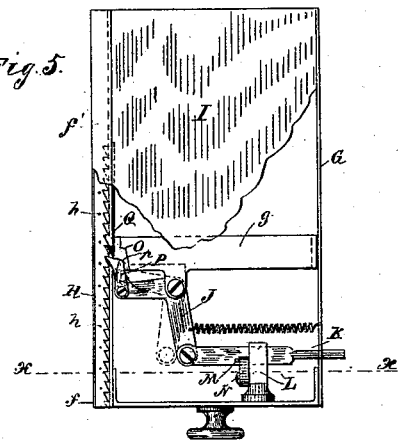
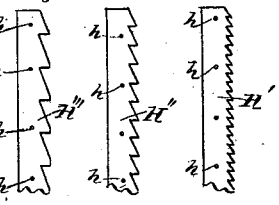
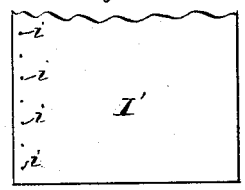
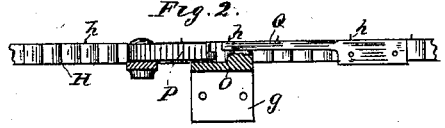
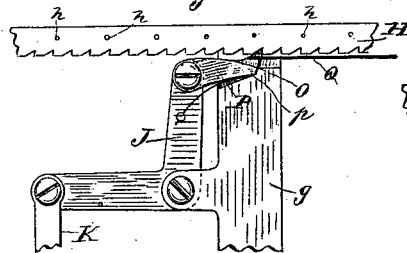
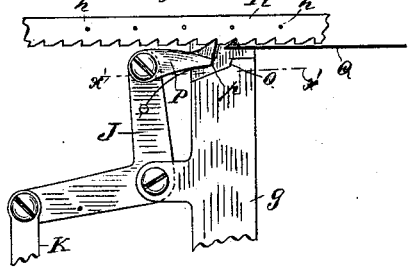
Witnesses:
A. H. Opsahl.
Frank D. Merchant.
Inventor
Geo. A. Goodson,
By his Attorneys.
Williamson & Blodgett

UNITED STATES PATENT OFFICE.

GEORGE A. GOODSON, OF MINNEAPOLIS, MINNESOTA.

MATRIX-MAKING MACHINE.

SPECIFICATION forming part of Letters Patent No. 478,258, dated July 5, 1892.

Application filed November 25, 1889. Serial No. 331,445. (No model.)

*To all whom it may concern:*

Be it known that I, GEORGE A. GOODSON, a citizen of the Dominion of Canada, residing at Minneapolis, in the county of Hennepin and State of Minnesota, have invented certain new and useful Improvements in Matrix-Making Machines; and I do hereby declare the following to be a full, clear, and exact description of the invention, such as will enable others skilled in the art to which it appertains to make and use the same.

My invention relates to matrix-making machines of the class described in several of my patents issued of date November 5, 1889;
and it has for its object to adapt such machines to the production of a matrix spaced to any desired font of type both between characters and lines, exactly as if the work had been hand-set with self-spacing type. To this end I adopt the self-spacing system for measuring the face and the point system for measuring the bodies of my dies. As is well known to printers, the characteristic of the self-spacing type is the adoption of the pica em as the standard for the measurement of the face of the type and the length of the line. This standard is then subdivided into a greater or less number of parts to get the unit small enough to measure the smallest character or space for any desired style of type of any given font. For example, agate may be cut to either twelve or thirteen units to a pica em, brevier to eight or nine units to a pica em, &c. The units differ for different fonts and for different styles of the same fonts, but are all fractions of a common standard—*i. e.*, a pica em, which is itself used to measure the line. Hence every line is also a multiple of the unit or smallest character or space of the particular font or style of font employed.

As is equally well known to printers, the point system is a uniform standard for measuring the bodies of type. In other words, a unit of body is adopted called a "point," and all type of the same font, no difference what the width of the face may be, have the same body. All the different fonts are in body multiples of the common unit or point. For example, six-point body is nonpareil; seven-point, minion; eight-point, brevier; nine-point, bourgeois; ten-point, long primer; eleven-point, small pica; and twelve-point pica. The unit or point is thirteen and five-sixths thousandths of an inch. These two principles combined give what might well be called the "self-justifying system of type," inasmuch as both the line and the column may be thereby much more easily justified. It also gives a printed sheet having uniformly-spaced characters and lines, which is easy on the eye. I embody these principles in my machine so as to produce a matrix by machinery having all the characteristics of a matrix taken from hand-set self-spacing type. To this end I provide my machine with a differential feed (not shown) for moving the matrix material along the line to space the characters and with a multiple-point differential feed for moving the matrix material laterally to space between the lines.

My invention herein set forth is directed to the spacing between the lines. To accomplish this result in a machine otherwise like that set forth in my former patents, I construct my matrix-material carriage of a design to receive any one of a series of multiple-point racks for holding the matrix material and provide the same with a pawl limited to an exact movement for feeding the particular rack in use forward the right distance without backlashing. Enough racks are provided to correspond to all the different fonts of type or dies. The six-point rack corresponds to six-point-body dies or nonpareil; seven-point rack, minion; eight-point, brevier; nine-point to bourgeois; ten-point to long primer; eleven-point to small pica, and twelve-point to pica. Hence all that is necessary to effect the proper change in the spacing between lines in changing from one font to another is to substitute the proper corresponding rack. So by the proper combinations any given font may be leaded, as desired. For example, to single-lead nonpareil a seven-point rack may be used, or an eight-point rack to double-lead the same.

In order to secure parallelism of the lines of impressions and commencement and termination at points in line with each other, an absolutely true left-hand column or base line must be established. To this end the matrix material must be held rigidly in a fixed position while receiving the impressions, each line starting at a predetermined uniform distance from the base or left-hand column-line. Any construction which will give a straight edge for the matrix material on the left and hold it there will answer the purpose. I accomplish this result with absolute certainty by providing each rack with a series of vertical studs or pins on its top surface in line with each other adapted to enter corresponding perforations made beforehand by a suitable die.

The accompanying drawings illustrate the preferred form of my invention, wherein, like letters referring to like parts—

Figure 1 is a longitudinal sectional elevation of a part of a matrix-machine, showing the carriage in position. Fig. 2 is a sectional view on line X X' of Fig. 5. Figs. 3 and 4 are enlarged plan views of a part of the carriage, showing the pawl in two different positions. Fig. 5 is a plan view of my improved carriage removed from the feed-slide, and Figs. 6, 7, and 8 are detail views in plan and section showing feed-rack and matrix material (card-board) detached.

A is part of the machine bed-plate.

B is the die-carriage bed.

C is the support for the die-impression device.

D is the plunger.

E is a part of the die-carriage.

F is a part of the line feed-slide resting on the bed and actuated by mechanism (not shown) to move the carriage forward along the line to properly space the characters therein.

G is the carriage proper of a skeleton drawer-like construction adapted to fit in a corresponding seat on the head of the feed-slide F. The carriage is provided on its left side with a rack-seat $f$. To the vertical wall of the rack-seat is preferably secured a gib or flange-plate $f'$, overhanging the face of the carriage a slight distance above its top surface.

H is one of the multiple-point racks in position.

H' H'' H''' are others of the multiple-point racks corresponding to other fonts of dies detached.

$h$ are the studs or pins on the racks.

I is a piece of the card-board or matrix material in position.

I' is a similar piece detached.

$i$ are the perforations in the card-board.

J is the pawl-actuating lever fulcrumed to center-piece $g$ of the carriage. K is a hand-lever for operating the same, working through a slotted banking-post L, fixed to the carriage.

M is a stop on the hand-lever for striking the banking-post and limiting the retraction or throw of the pawl.

N is a pivoted banking-piece normally reinforcing post L, but which may be thrown back to permit a longer movement of the pawl.

O is a pawl-stop formed by rabbeted wall on cross-bar $g$.

P is the feed-pawl secured to the end of the inner arm of lever J, having a beveled end adapted to co-operate with the stop-surface O.

Q is the locking spring-pawl. This locking-pawl is so located that it is on an exact line with the stop-surface O and is out of the way of the pawl P. As shown, it is located above the level of the pawl P. The pawl P when at the limit of its forward movement, the stop-surface O, and the hook of the locking-pawl Q are in the same vertical line. Hence the lock-pawl falls into the same notch of the rack occupied by the actuating-pawl and before the latter leaves it. This secures precision of movement of the rack and prevents backlashing. No other location of the single lock-pawl would secure this result with the different racks, as the spacing of the teeth is different. The pawls and the stop-surface must be in line transversely to the racks movement.

The operation is evident from the description already given. The card-board, having been perforated by the die, is placed in position over the studs on the rack corresponding to the font desired. The rack is then placed in its seat in the carriage and the carriage set in the feed-slide. After each line of impression is made the operator actuates the hand-lever K and feeds the rack forward one notch, carrying the matrix-board the proper distance for the space between the lines for that font of type.

Like operations on substitution of different racks give the spacing for any other fonts.

It should be noted that the racks, as described, run from six to twelve points. Hence the pawl may be given a normal throw just sufficient to catch any one less than the twelve-point-rack tooth. For the twelve-point spacing the six-point rack may be used and moved two notches. The pawl may be given the additional movement necessary by simply throwing back the pivoted banking-piece N.

What I claim, and desire to secure by Letters Patent, is as follows:

1. In a matrix-making or similar machine, the combination, with an impression-material carriage movable to effect the letter-feed, of a series of interchangeable racks applicable to said carriage and movable transversely to the travel of the same for holding the impression material and effecting the spacing between the lines.

2. In a matrix-making or similar machine, the combination, with an impression-material carriage movable to effect the letter-feed, of a series of interchangeable racks having differently-spaced teeth applicable to said carriage and movable transversely to the travel of the same for holding the impression material and effecting any desired spacing between the lines, substantially as described.

3. In a matrix-making or similar machine, the combination, with an impression-material carriage movable to effect the letter-feed, of a series of interchangeable racks for holding the impression material, having teeth differently spaced in accordance with the multiple-point system of type-bodies, any one of said racks being applicable to said carriage and movable transversely to the travel of the same to effect such spacing as may be required, as set forth.

4. In a matrix-making or similar machine, the combination, with an impression-material carriage movable to effect the letter-feed, of a removable rack mounted on said carriage and movable transversely to the travel of the same to effect the spacing between the lines, having a series of studs on its face in line with each other for locating and holding the impression material in a true line, substantially as described.

5. In a matrix-making or similar machine, the combination, with an impression-material carriage movable to effect the letter-feed, of a rack mounted on said carriage for holding the impression material and movable transversely to the travel of the carriage to effect the spacing between the lines and devices for giving an exact feed to said rack, consisting of a feed-pawl for driving the rack, a stop-surface for said pawl, and a locking-pawl for engaging and securing the rack at the end of each throw of the driving-pawl, the said stop-surface and the said locking-pawl being arranged in a true transverse line or common plane with each other for preventing either the backlashing or throwing by of the feed-rack.

6. The combination, with the impression-material carriage movable to effect the letter-feed, of the interchangeable racks applicable to the carriage for holding the impression material and affording any desired spacing between the lines, the feed-pawl for moving the rack, the stop-surface, and the locking-pawl arranged in a common transverse plane for giving an exact feed regardless of the particular rack in use, substantially as described.

7. The carriage having a rack-seat, in combination with the rack, a pivoted lever having a pawl, a hand-lever, a stop on said lever, a slotted banking-post, and a movable piece secured to said post, substantially as and for the purpose set forth.

8. The carriage having a rack-seat and a rack movable in said seat, in combination with the pivoted lever, the feed-pawl carried by said lever, and the stop-pawl secured to the carriage in line with the feed-pawl, substantially as and for the purpose specified.

In testimony whereof I affix my signature in presence of two witnesses.

GEORGE A. GOODSON.

Witnesses:
EMMA F. ELMORE,
WM. H. BLODGETT.